United States Patent Office.

JOSIAH W. ELLS, OF PITTSBURG, PENNSYLVANIA.

Letters Patent No. 67,857, dated August 20, 1867.

---

IMPROVED MODE OF FORMING A STEEL SURFACE ON SHEET AND BAR IRON.

---

The Schedule referred to in these Letters Patent and making part of the same.

---

TO ALL WHOM IT MAY CONCERN:

Be it known that I, JOSIAH W. ELLS, of Pittsburg, in the county of Allegheny, and State of Pennsylvania, have invented a new and improved Method of Forming a Cast-Steel Surface on Sheets or Bars of Wrought Iron; and I hereby declare that the following is a full, clear, and exact description thereof.

I take a "bloom" or bar of wrought iron, previously brought to a welding heat, and while in that condition place it in a properly-constructed flask or mould sufficiently large to leave a small space between the two. Into this space I pour molten steel, which effects a perfect union with the hot iron far superior to that brought about by any other means. As soon as the steel is "set" or become sufficiently cool to bear removal from the mould I fashion the compound ingot so made into sheets or bars by rolling or hammering, as the case may require.

I claim the herein-described method of forming a cast-steel surface on bars or sheets of wrought iron.

JOSIAH W. ELLS.

Witnesses:
EB. WILLIAMS, Jr.,
JOHN McKENNA.